2,868,850
Patented Jan. 13, 1959

2,868,850

METHOD FOR THE SYNTHESIS OF BROMO-1-CHLORO-4-BUTANE

Marcel Servigne, Sceaux, Etienné Szarvasi, La Celle Saint-Cloud, and Liliane Neuvy, Paris, France, assignors to l'Air Liquide, Societe Anonyme pour l'Etude et l'Exploitation des Procedes Georges Claude, Paris, France No Drawing. Application April 2, 1956
Serial No. 575,359

Claims priority, application France April 4, 1955

8 Claims. (Cl. 260—652)

The invention which is the subject-matter of our U. S. patent application S. N. 459,836 filed October 1, 1954 relates to a process for the synthesis of N-alpha-benzoyl-dl-lysine from a dihalogeno-1,4-butane which is preferably bromo-1-chloro-4-butane.

It was indicated, in the descriptive specification for this patent that bromo-1-chloro-4-butane could be prepared by the known method of Starr and Hixon (J. Amer. Chem. Soc., 1934, page 1595) which consists in reacting phosphorus tribromide with delta-chlorobutanol. This method offers a number of drawbacks: phosphorus tribromide is a costly product; lengthy and numerous operations are necessary for the preparation of delta-chlorobutanol and for the separation of bromo-1-chloro-4-butane; finally, the total yield of this method, taking into account the preparation of delta-chlorobutanol, does not exceed 52%, even in the most favorable case.

Starr and Hixon prepare delta-chlorobutanol by reacting gaseous hydrochloric acid with boiling tetrahydrofuran until the temperature of the liquid reaches 106° C., then subjecting the raw reaction product to two consecutive distillations, under reduced pressure, the first distillation giving only a product which passes over an interval of 10° C. The yield may vary within wide limits, since, even under a satisfactory vacuum, the distillation destroys part of the delta-chlorobutanol for reforming some tetrahydrofuran, which is lost in the vacuum pump, and hydrochloric acid.

For segregating the bromo-1-chloro-4-butane obtained at low temperature by the action of phosphorus on the delta-chlorobutanol, Starr and Hixon first heat the reaction mixture for ten hours over a water bath, then they wash it with water, extract it with ether and wash it until neutral by means of a diluted solution of potassium carbonate; the ether solution is then dried by allowing it to stand in contact with a drying agent, the ether is evaporated and finally the bromo-1-chloro-4-butane is then segregated by distillation.

The present improvement has the object of overcoming the above mentioned drawbacks; it is characterized in that the bromo-1-chloro-4-butane is prepared by adding bromine to a mixture of phosphorus and delta-chlorobutanol, the temperature of the mixture being held, during the addition of bromine, to a value under 30° C., and preferably between 10° C. and 20° C., so that the reaction does not become too lively.

The replacement of phosphorus tribromide by bromine and phosphorus makes the process much more economical.

It was found further that it was possible to mix with the phosphorus, raw delta-chlorobutanol obtained directly by the reaction of gaseous hydrochloric acid with boiling tetrahydrofuran, undetrimentally to the purity of the desired final product; by eliminating the two distillations under reduced pressure which were necessary in the older process, the total yield in bromochlorobutanol is increased.

It was also found that the delta-chlorobutanol can also be prepared by heating tetrahydrofuran under reflux with an aqueous solution of hydrochloric acid until the temperature of the liquid reaches 91° C., which requires approximately two hours; with this method of preparation, the delta-chlorobutanol cannot be used in its raw condition, but a single distillation is sufficient for obtaining this substance in a very pure condition. Although the yield in pure product, after this distillation, does not exceed 34 to 35%, this operational procedure can offer an interest when industrial needs require a rapid preparation or when it is desired to avoid working with gaseous hydrochloric acid.

After the introduction of bromine into the mixture of phosphorus and delta-chlorobutanol, the batch is heated over a water bath until the evolution of hydrobromic acid ceases, i. e. during about 90 minutes. According to a preferred embodiment of the invention, the organic product is segregated from the reaction mass by steam distillation, the organic layer being separated from the water by decantation; the waters are then extracted by a small amount of benzene, the benzenic layer is added to the previously decanted product and the product is distilled; the presence of benzene ensures the drying by azeotropic distillation without having to use any solid drying agent. Instead of neutralizing with potassium carbonate, one adds to the residue a small amount of an organic base such as diethanolamine, then distillation is effected under reduced pressure for obtaining bromo-1-chloro-4-butane.

The final product is neutral, colorless, and distills over a very small interval of temperature. The yield for the entire preparation, calculated from the amount of tetrahydrofuran at the start, is 66 to 69%. In addition, the lengthiest operations being eliminated, the production capacity of a given installation can be increased considerably.

By way of example, the detail is given, hereinafter, of the various phases of the preferred procedure for preparing bromo-1-chloro-4-butane.

*(1) Preparation of delta-chlorobutanol by treating tetrahydrofuran with gaseous hydrochloric acid*

There are placed, in a three-necked round-bottomed flask, provided with a heating device, a thermometer, a reflux type refrigerator and a porous plate type gas diffusion element:

500 grams (6.95 mols) of tetrahydrofuran and traces of zinc chloride.

A stream of dry hydrochloric acid is passed through the boiling product until the thermometer immersed in the liquid indicates 106° C. (approximately 5 to 8 hours).

The delta-chlorobutanol has the appearance of a dark yellow liquid. It may be used directly for the preparation of the bromo-1-chloro-4-butane, or it may be filtered on charcoal; it is possible, if desired, to just stir the product inside a flask with charcoal.

The yield is 720 grams, i. e. 96%, the theoretical yield being 750 grams.

*(2) Preparation of delta-chlorobutanol by treating tetrahydrofuran with a commercial aqueous solution of hydrochloric acid*

Heating under reflux is effected with:
72 grams (1 mol) of tetrahydrofuran and
200 cm.$^3$ of a commercial hydrochloric acid solution to about 36% (2 mols).

When the temperature of the liquid reaches 91° C. the reaction is completed (which requires about two hours).

The black liquid is extracted with twice 100 cm.$^3$ of benzene, then the benzene and hydrochloric acid are driven off under reduced pressure, after which the product is distilled.

There is obtained:

36.5 grams of a colourless liquid (B. P.$_{12}$=80–82° C.). The yield is 34%, the theoretical yield being 108 g.

*(3) Preparation of bromo-1-chloro-4-butane*

There are placed in a six liter four-necked round-bottomed flask, provided with a dropping funnel, a thermometer, a stirrer and a reflux type cooler.

1,728 grams (16 mols) of raw delta-chlorobutanol and 168 grams $$\frac{(16 \text{ atoms})}{3}$$

There are added drop by drop through the dropping funnel at a temperature between 10 and 20° C.

1,728 grams (16 atoms+35% in excess) of pure bromine.

When the addition is completed, the mixture is allowed to warm slowly, then it is heated over a water bath, until the evolution of hydrobromic acid ceases. The chlorobromobutane is driven off by steam distillation. The organic layer is decanted; the watery layer is extracted with about 1,800 cm.³ of benzene. The two layers are gathered together; then the benzene and the product are distilled under reduced pressure, in the presence of 16 grams of diethanolamine (1 gram for 1 mol of delta-chlorobutanol).

1,600 cm.³ of benzene are recovered and there is obtained:

1,885 to 1,980 grams of colourless liquid (B. P.$_{10}$=59°–62° C.) and a slight quantity of head products and of a residue in the flask.

The yield is 69–72% from the delta-chlorobutanol, the theoretical yield being 2,470 grams.

The total yield of operations 1 and 3 from tetrahydrofuran is 66–69%.

What we claim is:

1. A process for the manufacture of bromo-1-chloro-4-butane, comprising passing gaseous hydrochloric acid through boiling tetrahydrofuran to form raw delta-chlorobutanol, then adding bromine to a mixture of said raw delta-chlorobutanol and phosphorus, the temperature of said mixture being held during the addition of bromine under 30° C.

2. A process for the manufacture of bromo-1-chloro-4-butane, comprising passing gaseous hydrochloric acid through boiling tetrahydrofuran to form raw delta-chlorobutanol, adding bromine to a mixture of said raw delta-chlorobutanol and phosphorus, the temperature of said mixture being held during the addition of bromine under 30° C., and segregating from the reaction mass by steam distillation the bromo-1-chloro-4-butane obtained and the major part of the evolved hydrobromic acid.

3. A process according to claim 2, in which the segregated bromo-1-chloro-4-butane is dried by an azeotropic distillation, then distilled in the presence of an organic base, such as diethanolamine.

4. A process for the manufacture of bromo-1-chloro-4-butane, comprising passing gaseous hydrochloric acid through boiling tetrahydrofuran to form raw delta-chlorobutanol, then adding bromine to a mixture of said raw delta-chlorobutanol and phosphorus, the temperature of said mixture being held during the addition of bromine between 10° C. and 20° C.

5. A process for the manufacture of bromo-1-chloro-4-butane, comprising passing gaseous hydrochloric acid through boiling tetrahydrofuran until the temperature of the liquid reaches about 106° C., cooling said liquid, then adding bromine to a mixture of said liquid and phosphorus, the temperature of said mixture being held during the addition of bromine under 30° C.

6. A process for the manufacture of bromo-1-chloro-4-butane, comprising passing gaseous hydrochloric acid through boiling tetrahydrofuran until the temperature of the liquid reaches about 106° C., cooling said liquid, then adding bromine to a mixture of said liquid and phosphorus, the temperature of said mixture being held during the addition of bromine between 10° C. and 20° C.

7. A process for the manufacture of bromo-1-chloro-4-butane, comprising passing gaseous hydrochloric acid through boiling tetrahydrofuran until the temperature of the liquid reaches about 106° C., cooling said liquid, adding bromine to a mixture of said liquid and phosphorus, the temperature of said mixture being held during the addition of bromine between 10° C. and 20° C., and segregating from the reaction mass by steam distillation the bromo-1-chloro-4-butane obtained and the major part of the evolved hydrobromic acid.

8. A process according to claim 7, in which the segregated bromo-1-chloro-4-butane is dried by an azeotropic distillation, then distilled in the presence of an organic base, such as diethanolamine.

References Cited in the file of this patent

FOREIGN PATENTS 565,452   Great Britain _____ Nov. 10, 1944

OTHER REFERENCES

Starr et al.: Jour. Am. Chem. Soc., vol. 56, pp. 1595–6 (1934).